United States Patent [19]

Friesen et al.

[11] Patent Number: 5,410,745
[45] Date of Patent: Apr. 25, 1995

[54] DETECTOR AND VIDEO AMPLIFIER

[75] Inventors: Michael J. Friesen; Shawn F. Nixon, both of Phoenix, Ariz.

[73] Assignee: Motorola, Inc., Schaumburg, Ill.

[21] Appl. No.: 64,314

[22] Filed: May 20, 1993

[51] Int. Cl.[6] .............................. H04N 1/28; h04n 5/14
[52] U.S. Cl. .................................... 455/333; 348/707
[58] Field of Search ............... 455/330, 333, 337, 338, 455/341, 312; 330/277, 289, 299, 300, 307, 308, 310, 311; 348/707; 358/184

[56]  References Cited

U.S. PATENT DOCUMENTS

| | | | |
|---|---|---|---|
| 3,321,576 | 5/1967 | Linder et al. | 178/7.3 |
| 4,367,491 | 1/1983 | Hartford | 358/188 |
| 4,554,678 | 11/1985 | Bowman | 455/333 |
| 4,594,557 | 6/1986 | Shillady | 455/337 |
| 4,636,742 | 1/1987 | Oritani | 330/277 |
| 4,758,793 | 7/1988 | Sheade et al. | 328/145 |
| 4,890,069 | 12/1989 | Duffalo et al. | 330/277 |
| 5,010,305 | 4/1991 | Shiga | 330/277 |
| 5,051,703 | 9/1991 | Idogawa et al. | 455/312 |
| 5,079,454 | 1/1992 | Benton et al. | 330/277 |
| 5,162,755 | 11/1992 | Mara, Jr. et al. | 330/277 |

OTHER PUBLICATIONS

Shrader, Robert L. "Electronic Communication", Fifth Edition, 1985, pp. 152–153, 295, 405–406.

An article entitled "Submillimeter Heterodyne Detection with Planar GaAs Schottky-Barrier Diodes", by R. A. Murphy et al, from IEE transactions On Microwave Theory and Techniques, vol. MTT-25, No. 6, Jun. 1977.

Primary Examiner—Edward F. Urban
Assistant Examiner—Mark D. Wisler
Attorney, Agent, or Firm—Jeffrey D. Nehr

[57] ABSTRACT

A detector/video amplifier (DVA) includes a microwave monolithic integrated circuit (MMIC) detector processor for converting a modulated RF input signal to a baseband signal in video and a MMIC amplifier coupled to and located on a single MMIC chip with the MMIC detector processor. The MMIC amplifier amplifies the baseband signal to the video output signal. The DVA is temperature compensated and achieves detection across the full Ku band (12–18 GHz).

12 Claims, 2 Drawing Sheets

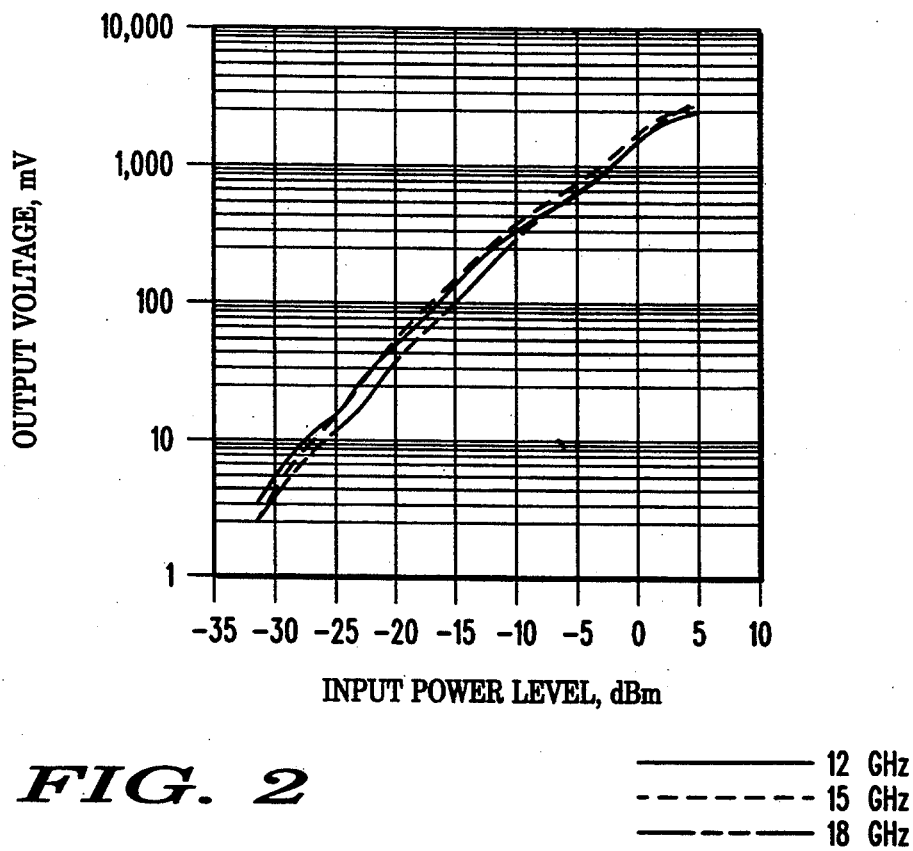
FIG. 2
— 12 GHz
---- 15 GHz
--- 18 GHz
+25 C ———
+40 C ----
+0 C ---
FIG. 3
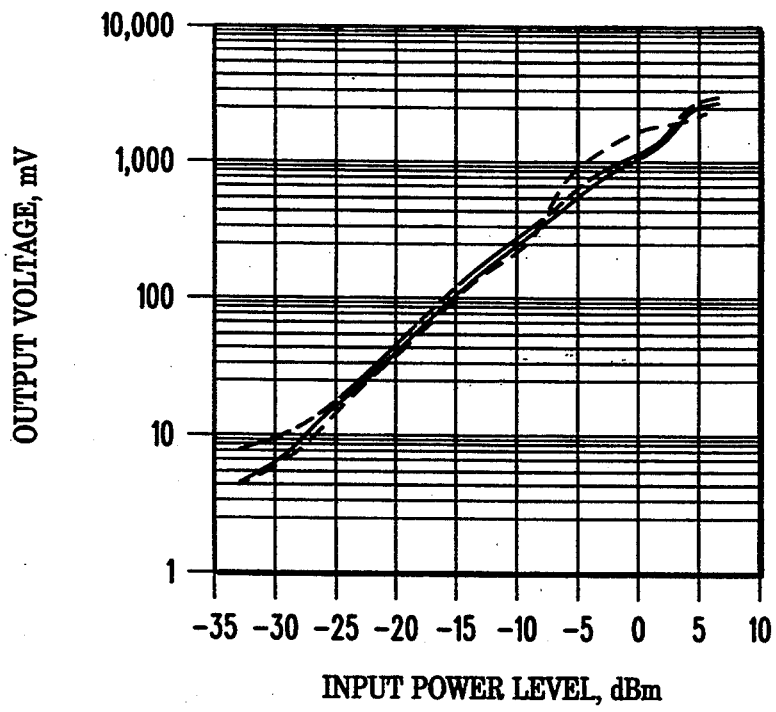

DETECTOR AND VIDEO AMPLIFIER

The U.S. Government has a paid-up license in this invention and the right in limited circumstances to require the patent owner to license others on reasonable terms as provided for by the terms of contract No. 90-C5431.

FIELD OF THE INVENTION

This invention relates in general to detection and amplification and, in particular, to detector/video amplifiers using microwave monolithic integrated circuit (MMIC) technology.

BACKGROUND OF THE INVENTION

A detector converts a radio frequency (RF)/microwave modulated signal from an input high frequency to a baseband signal, typically in a video or an audio frequency range. The conversion is achieved with a non-linear device (typically a diode)in order to recover transmitted information in a large dynamic range at the input and to translate the baseband signal to a relatively compressed output dynamic for ease of signal processing. The diode output is proportional to the squared value of the input, giving rise to the term "square law" device.

The problem to be solved is to accomplish the detection function when using a planar, monolithic medium and to also realize other down converter or receiver components in the same medium. Microwave monolithic integrated circuit (MMIC) technology is becoming an industry standard for many devices and is continually migrating toward a higher level of integration. More densely integrated functions are required: in the quest to obtain an entire receiver on a single MMIC die.

What is desired is to provide a detector/video amplifier (DVA) which achieves detection across the full Ku band (12-18 GHz), with temperature compensation and video amplification on a single MMIC chip. It is also desirable that such a DVA be achievable using commercially available gallium arsenide (GaAs) processes. It is desirable that the DVA achieve physical size, weight, and cost savings over previous apparatus and methods.

SUMMARY OF THE INVENTION

Accordingly, it is an advantage of an embodiment of the present invention to provide a new and improved apparatus for RF/microwave detection and amplification of a video signal. It is a further advantage of the present invention that such a DVA be implemented on a single MMIC die.

To achieve these advantages, a DVA device is contemplated which includes a microwave monolithic integrated circuit (MMIC) detector processor for converting a modulated RF input signal to a baseband signal in video, and a MMIC amplifier coupled to and indicated on a single MMIC chip with the MMIC detector processor, the MMIC amplifier for amplifying the baseband signal to a video output signal.

The DVA uses a MMIC diode as the detector and is temperature compensated. The DVA achieves detection across the full Ku band (12-18 GHz).

The above and other features and advantages of the present invention will be better understood from the following detailed description taken in conjunction with the accompanying drawings.

BRIEF DESCRIPTION OF THE DRAWINGS

In FIG. 2, there is shown a graph of the output voltage versus input power for the DVA in FIG. 1; and In FIG. 3, there is shown a graph of the output voltage versus input power as dependent upon temperature for the DVA in FIG. 1.

DETAILED DESCRIPTION OF THE PREFERRED EMBODIMENT

Figure 1:
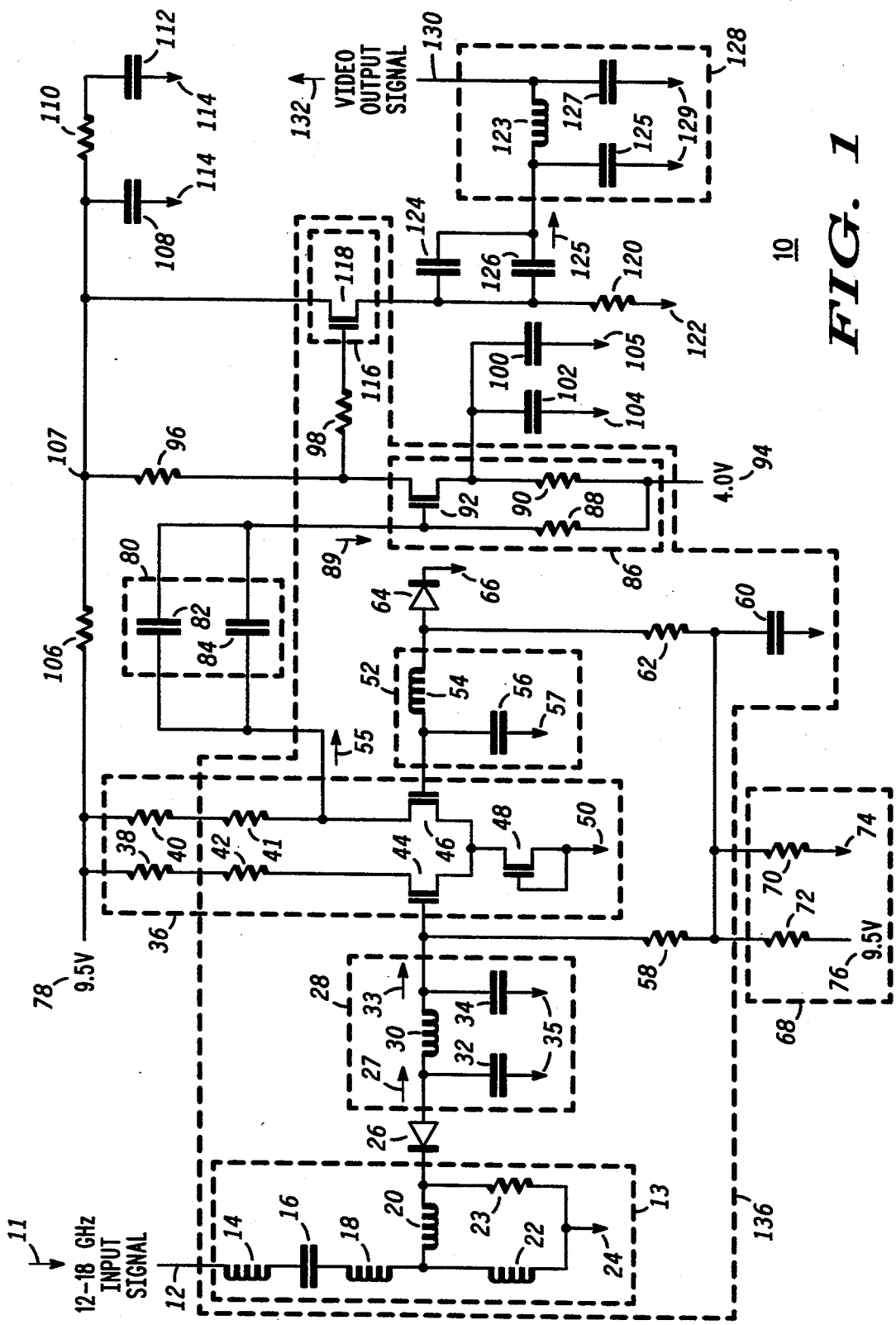
In FIG. 1, there is shown a schematic of a DVA in accordance with a preferred embodiment of the invention.

The DVA device contemplated herein has been designed and fabricated using commercially available MMIC processing techniques. The preferred embodiment was built using GaAs MMIC processing. Such techniques are available from a number of companies, including Texas Instruments. The DVA device detects a wide variety of radio frequency (RF) pulses from 100 nanoseconds to 50 microseconds in the Ku band. In general, the DVA consists of a Schottky barrier diode matched to 50 ohms at the input, a temperature compensated video amplifier, and a source follower current source to drive a 95 ohm video impedance. All but some decoupling and bias circuitry can be contained on a single MMIC chip measuring approximately 1.83 millimeters by 3.68 millimeters by 0.152 millimeters (72 mils by 145 mils by 6 mils ). The DVA converts a modulated RF input signal to a baseband signal at video frequencies, approximately 5 kHz to 17 MHz, as is described below.

FIG. 1 shows a simplified schematic of a complete detector and video amplifier circuit (DVA 10) in accordance with the preferred embodiment of the invention. All components contained within the boundaries of the dashed box 136 in FIG. 1 are contained on the MMIC die. All other supporting circuitry is off chip due to the need to select a component for alignment, or the physical size of the part such as the 22 microfarad capacitors needed to pass 50 microsecond pulses.

In particular in FIG. 1, input signal 11, which can be a 12-18 GHz signal, is input to input 12. Input 12 is coupled to impedance matching network 13. Impedance matching network 13 comprises inductor 14 coupled in series to capacitor 16 which is in turn coupled in series to inductor 18. Inductor 18 is coupled to a first side of both inductors 20 and 22. A second side of inductor 22 is coupled to electrical ground 24. A second side of inductor 20 is coupled through resistor 23 to the same electrical ground 24. Capacitor 16 has the approximate value 0.19 picofarads and resistor 23 has the approximate value 150 ohms in impedance matching network 13. Inductors 14, 18, 20, and 22 are distributed transmission line elements approximately on the order of 0.1 nanohenrys in the preferred embodiment. The output of impedance matching network 13 is coupled to a detector processor, specifically detector processing diode 26. Detector processing diode 26 is coupled with its cathode coupled to impedance matching network 13. Detector processing diode 26 outputs signal 27 to low pass filter 28 (approximately 200 MHz).

Low pass filter 28 consists of a $\pi$ circuit comprising inductor 30 coupled at either end through capacitors 32 and 34, respectively, to electrical ground 35. Signal 27 is filtered by low pass filter 28 resulting in output signal 33 input to differential amplifier 36. Inductor 30 has a value of approximately 1.5 nanohenrys, and capacitors 32 and 34 each have an approximate value of 5 picofarads in low pass filter 28.

Differential amplifier 36 is comprised of a pair of field effect transistors, FET 44 and FET 46. DC voltage bias 78 provides 9.5 volts in the preferred embodiment to the differential amplifier 36. DC voltage bias 78 is coupled through resistor 38 and resistor 42 in series to the source of FET 44. DC voltage bias 78 is also coupled through resistor 40 and resistor 41 to the source of FET 46. Signal 33 is input to the gate of FET 44 (i.e. a first differential amplifier 36 input). The sources of both FET 44 and FET 46 are coupled to the drain of FET 48. The gate of FET 48 is coupled to the source of FET 48 which is in turn coupled to electrical ground 50. Thus, FET 48 operates as a current source for differential amplifier 36. The nominal values for resistors 38 and 40 are 390 ohms and for resistors 42 and 41, 250 ohms. FET 48 sinks a constant 20 milliamps of current through FETs 42 and 46.

The gate of FET 46 is coupled to capacitor 56 which is in turn coupled to electrical ground 57. At the same time, the gate of FET 46 is coupled through the series combination of inductor 54 and temperature compensating diode 64 to electrical ground 66. The cathode of temperature compensating diode 64 is coupled to electrical ground 66. Inductor 54 has the approximate value 1.5 nanohenrys in the preferred embodiment. Thus, the gate of FET 46 is a second input to differential amplifier 36. Capacitor 56 has the approximate value 5 picofarads in the preferred embodiment. The combination of capacitor 56 and inductor 54 functions as decoupling circuitry 52. Decoupling circuitry 52 provides isolation between differential amplifier 36 and the temperature compensator, specifically temperature compensation diode 64 in the preferred embodiment.

In function, differential amplifier 36 multiplies the difference between signal 33 and any signal arising from temperature compensating diode 64 due to temperature changes. Detector processing diode 26 and temperature compensation diode 64 are matched, with the result that the differential amplifier 36 amplifies only the signal arising from the input signal 11, and outputs a signal 55 from the drain of FET 46 which is temperature compensated.

The drain of FET 46 (with the output of differential amplifier 36 resulting from the processing of input signal 11) is coupled to a DC blocker, namely DC blocking capacitor 80. In the preferred embodiment, DC blocking capacitor 80 comprises capacitor 82 and capacitor 84 in parallel. Capacitor 82 is an approximately a 0.1 microfarad capacitor and capacitor 84 is an approximately 22 microfarad capacitor in the preferred embodiment. The processed and DC blocked signal 89 output from DC blocking capacitor 80 is input to common source amplifier 86. Common source amplifier 86 is comprised of FET 92, resistor 88, and resistor 90. The gate of FET 92 is coupled through resistor 88 to one side of resistor 90. The second side of resistor 90 is coupled to the source of FET 92. The common connection of resistors 88 and 90 is coupled to DC bias 94, which in this preferred embodiment is approximately 4 volts. The source of FET 92 is also coupled through capacitor 100 to electrical ground 105 and through capacitor 102 to electrical ground 104. Capacitor 100 has the approximate value 0.1 microfarads and capacitor 102 has the approximate value 22 microfarads in the preferred embodiment.

DC voltage bias 78, approximately 9.5 volts in the preferred embodiment, is also input through resistor 106 to junction 107. Junction 107 is also coupled through capacitor 108 to electrical ground 114 and through the series combination of resistor 110 and capacitor 112 to electrical ground 114. In the preferred embodiment, resistor 106 has the approximate value 5.1 ohms, capacitor 108 has the approximate value 0.1 microfarads, resistor 110 has the approximate value 22 ohms, and capacitor 112 has the approximate value 22 microfarads.

Junction 107 is also coupled through resistor 96 to the drain of FET 92. Resistor 96 is nominally 240 ohms in the preferred embodiment. Resistor 96 controls the gain of the video amplifier. Junction 107 is also coupled to the drain of FET 118.

The drain of FET 92 is coupled through resistor 98 to the gate of FET 118. Resistor 98 has the approximate value 100 ohms in the preferred embodiment. FET 118 acts as a source follower amplifier 116 to amplify the current from the detected and DC blocked signal output from the drain of FET 92. The amplified signal output from FET 118 proceeds through the parallel combination of capacitors 124 and 126 as signal 125. The source of FET 118 in addition to being coupled to the parallel connection of capacitors 124 and 125, is coupled through resistor 120 to electrical ground 122. Capacitor 124 has the approximate value 0.1 microfarads, capacitor 126 has the approximate value 22 microfarads, and resistor 120 has the approximate value 1,000 ohms in the preferred embodiment.

The processed, DC blocked, amplified signal 121 from the parallel connection of capacitors 124 and 125 is input to low pass filter 128. Low pass filter 128 comprises the $\pi$ circuit of inductor 123 connected at either side through capacitors 125 and 127 respectively, to electrical ground 129. Inductor 123 has the approximate value 1.81 nanohenrys, capacitor 125 has the approximate value 100 picofarads, and capacitor 127 has the approximate value 100 picofarads in the preferred embodiment. The output of low pass filter 128 forms output signal 132 at output 130.

Overall, the bias scheme for the DVA 10 is complicated due to the DC interaction among most of the stages. The detector processing diode 26 is biased with approximately 0.6 volts and draws 200 to 300 microamps. The 0.6 volts which biases the detector processing diode 26 also biases the gate of FET 44 and differential amplifier 36. The similarly biased temperature compensating diode 64 sets the voltage at the gate of FET 46. FET 46 can be a MESFET in the differential amplifier 36. This structure provides temperature compensation for the gain of the differential amplifier 36 and the sensitivity variation over temperature in the detector processing diode 26. Due to the positive bias on the gate of FET 44, which can also be a MESFET, a 20 milliamp current source (FET 48) is located to keep the source voltage of FET 44 above the gate voltage in order to prevent catastrophic forward bias.

Between the differential amplifier 36 and the 150 micrometer gain stage (FET 92) off chip DC blocking capacitor 80 provides decoupling and prevents temperature variation between the differential amplifier 36 and the 150 micrometer gain stage (FET 92). The gain stage (FET 92) is DC coupled to the 900 micrometer source follower amplifier 116 stage (which can be a very large MESFET) in order to sink at least 22 milliamps into a 95 ohm video impedance at output 130. The off chip bias to the 150 micrometer stage (FET 92) controls the gain of that stage in addition to the bias point of the 150 micrometer (FET 92) and 900 micrometer (FET 118) stage. The output of FET 118 is AC coupled off chip with some video filtering in low pass filter 128 to set the overall desired bandwidth which, in the case of the preferred embodiment, is 17 Mhz, but could be as high as approximately 200 MHz.

FIG. 2 shows the preferred embodiment DVA measured performance for three frequencies, namely 12, 15, and 18 GHz. Thirty-five decibels of instantaneous input dynamic range across the 12-18 GHz band is achieved from −32 to +3 dBm, producing an output from approximately 3 millivolts to 2.1 volts.

The temperature performance of the preferred embodiment DVA is shown in FIG. 3. The DVA is relatively insensitive to temperature variations of 40° C. across 80% of the dynamic range. At 40° C., the larger input levels show more gain than nominal, primarily due to the change in bias at hotter temperatures in the video amplifier. This affect could be alleviated by optimizing the bias conditions over temperature.

A summary of the DVA performance characteristics can be seen in Table 1.

TABLE 1

| Parameter | Measured | Units |
| --- | --- | --- |
| Transfer function | −32 to +3 | dBm |
| Total Integrated Noise | 1.0 | mV |
| Input Noise Density (1 kHz) | 160 | $nV/Hz^{0.5}$ |
| DC Current | 40 | mW |
| Overshoot | 5 | % |
| Pulse Width Error (50-50%) | 8 | nS |
| Rise/Fall Time | 25 | nS |
| Droop (50 uS pulse) | 6 | % |
| Input Return Loss | −10.5 | dB |

The DVA contemplated herein is directed to microwave receiver systems incorporating MMIC technology in highly integrated form. Integrating the detector on gallium arsenide MMIC yields a compromise due to the slightly less than optimum performance of the MMIC diode compared to that of commercially available devices with low barrier voltages exhibiting lower noise characteristics. The advantage of the MMIC detector/video amplifier contemplated here, however, is that the device is a completely integrated, requiring only a 50 ohm microwave interconnection at the input and several DC connections in addition to the video output. All other commercially available detectors are typically quite large or are simply diodes which must be implemented in a "hybrid" topology. The MMIC form has the potential to yield the detector function in a MMIC based system at reduced cost, size, weight, and power.

The DVA described above is a general purpose detector/video amplifier which can be utilized for signal detection. The DVA is very small in physical size and offers the potential for low cost production because of the single chip implementation. The signal detection function is present in almost all forms of electronic equipment. Some specific applications are described in the following paragraphs.

The signal detection function can be used in automatic gain control circuits to level output signal power over various external factors. The output signal from power amplifiers can vary due to temperature, aging, or other factors. The output signal can be measured by the DVA described herein and used to control the forward gain of the amplifier, resulting in a constant output power level.

Signal detection is also valuable for built-in test equipment which monitors the operation of the equipment and detects fault within the equipment. The measured amplitude of an RF signal by the DVA described herein can be compared to a predetermined acceptable level to ensure that the equipment is operating properly.

Antenna pointing can be; accomplished using multiple detectors with an external comparison circuit. High gain antennas offer narrow beam widths which must be accurately pointed to minimize transmission losses. The pointing can be based upon received signal strength. An array of DVAs can be used for comparison purposes to provide the error term in a closed loop system to steer the antenna.

The DVA unit can also be used for direct detection of transmitted RF energy. As such, the DVA is useful as a detector for police radar detectors.

RF energy detection can: also be used in conjunction with personnel safety to insure that only safe levels of radiation are being received. Radar operators and maintenance personnel can monitor RF levels and be ensured that the levels which they encounter are safe.

The DVA can also be used as a receiver detecting pulse code modulated (PCM) signals for data and voice transfer in addition, the DVA can be an integral component for internal calibration of RF equipment, providing an easily readable video signal proportional to signal strength of the RF output of the equipment.

Thus, a detector/video amplifier has been described which overcomes specific problems and accomplishes certain advantages relative to prior art methods and mechanisms. The improvements over known technology are significant. The DVA can perform the detection and video amplification functions in a device occupying a very small physical size with the potential of low cost production in high volume due to its integration on gallium arsenide MMIC substrates. In addition, the detector/video amplifier is realizable via commercially available standard MMIC processes. Furthermore, applications for such a DVA include automatic gain control circuits, test equipment monitors, antenna pointing systems, direct detection systems for transmitted RF energy, personnel safety systems, and internal calibration systems for RF equipment.

Thus, there has also been provided, in accordance with an embodiment of the invention, a detector/video amplifier that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A detector and video amplifier comprising:
   an impedance matching network for receiving a radio frequency (RF) or microwave modulated signal;
   a detector coupled to the impedance matching network, the detector for converting the RF or microwave modulated signal to the baseband signal in video;
   MMIC amplifier means coupled to and located on a single MMIC chip with the detector, the MMIC amplifier means for amplifying the baseband signal in video to a video output signal;

a low pass filter coupled to the detector, the low pass filter for receiving the baseband signal in video and producing a filtered baseband signal; and temperature compensating means coupled to the low pass filter, the temperature compensating means for correcting for changes in performance of the detector with temperature changes, wherein the temperature compensating means comprises:

a differential amplifier having first and second differential amplifier inputs and producing a differential amplifier output, wherein the first differential amplifier input is coupled to the low pass filter for receiving the filtered baseband signal;

decoupling circuitry coupled to the second differential amplifier input, the decoupling circuitry for providing signal isolation;

a temperature compensating second diode having a cathode coupled to electrical ground and an anode coupled to the decoupling circuitry, wherein the differential amplifier produces the differential amplifier output corrected for changes in performance of the first diode with temperature changes.

2. A detector and video amplifier as claimed in claim 1, wherein the detector comprises a first diode having a cathode coupled to the impedance matching network and an anode coupled to the low pass filter.

3. A detector and video amplifier as claimed in claim 1, wherein the detector further comprises a DC blocking means coupled to the temperature compensating means, the DC blocking means for passing only non-DC portions of the baseband signal in video.

4. A detector and video amplifier as claimed in claim 1, wherein the MMIC amplifier means comprises a common source field effects transistor (FET) amplifier for receiving the baseband signal in video and producing a once-amplified baseband signal in video.

5. A detector and video amplifier as claimed in claim 4, wherein the MMIC amplifier means further comprises a FET source follower amplifier coupled to the common source FET amplifier, the FET source follower amplifier for receiving the once-amplified baseband signal in video and producing the video output signal.

6. A detector and video amplifier as claimed in claim 1, further comprising a low pass filter coupled to the MMIC amplifier means, the low pass filter for filtering the video output signal.

7. A radio frequency (RF) signal detector on a single microwave monolithic integrated circuit (MMIC) chip, the RF detector for monitoring RF energy and comprising:

an impedance matching network for receiving a modulated RF input signal;

a detector coupled to the impedance matching network, the detector for converting the RF modulated input signal to the baseband signal in video;

MMIC amplifier means coupled to and located on a single MMIC chip with the detector, the MMIC amplifier means for amplifying the baseband signal in video to a video output signal;

a low pass filter coupled to the detector, the low pass filter for receiving the baseband signal in video and producing a filtered baseband signal; and temperature compensating means coupled to the low pass filter, the temperature compensating means for correcting for changes in performance of the detector with temperature changes, wherein the temperature compensating means comprises:

a differential amplifier having first and second differential amplifier inputs and producing a differential amplifier output, wherein the first differential amplifier input is coupled to the low pass filter for receiving the filtered baseband signal;

decoupling circuitry coupled to the second differential amplifier input, the decoupling circuitry for providing signal isolation; and a temperature compensating second diode having a cathode coupled to electrical ground and an anode coupled to the decoupling circuitry, wherein the temperature compensating means produces the differential amplifier output corrected for changes in performance of the first diode with temperature changes.

8. A RF signal detector as claimed in claim 7 wherein the detector comprises a first diode having a cathode coupled to the impedance matching network and an anode coupled to the low pass filter.

9. A RF signal detector as claimed in claim 7, wherein the MMIC detector processing means further comprises a DC blocking means coupled to the temperature compensating means, the DC blocking means for passing only non-DC portions of the baseband signal in video.

10. A RF signal detector as claimed in claim 7, wherein the MMIC amplifier means comprises a common source field effect transistor (FET) amplifier for receiving the baseband signal in video and producing a once-amplified baseband signal in video.

11. A RF signal detector as claimed in claim 10, wherein the MMIC amplifier means further comprises a FET source follower amplifier coupled to the common source FET amplifier, the FET source follower amplifier for receiving the once-amplified baseband signal in video and producing the video output signal.

12. A RF signal detector as claimed in claim 7, further comprising a low pass filter coupled to the MMIC amplffier means, the low pass filter for filtering the video output signal.

* * * * *